US009789427B2

(12) United States Patent
Freystedt et al.

(10) Patent No.: US 9,789,427 B2
(45) Date of Patent: Oct. 17, 2017

(54) APPARATUS FOR TREATING WATER, PARTICULARLY FILTER APPARATUS, AND CARTRIDGE

(75) Inventors: Bernd Freystedt, Wiesbaden (DE); Marc Namur, Darmstadt (DE)

(73) Assignee: BRITA GMBH, Taunusstein (DE)

( * ) Notice: Subject to any disclaimer, the term of this patent is extended or adjusted under 35 U.S.C. 154(b) by 1037 days.

(21) Appl. No.: 12/737,280

(22) PCT Filed: Jun. 26, 2009

(86) PCT No.: PCT/EP2009/058053
§ 371 (c)(1),
(2), (4) Date: Dec. 23, 2010

(87) PCT Pub. No.: WO2009/156509
PCT Pub. Date: Dec. 30, 2009

(65) Prior Publication Data
US 2011/0139698 A1    Jun. 16, 2011

(30) Foreign Application Priority Data

Jun. 27, 2008  (DE) .................. 10 2008 002 727

(51) Int. Cl.
*B01D 35/157*  (2006.01)
*B01D 35/147*  (2006.01)

(52) U.S. Cl.
CPC ...... *B01D 35/147* (2013.01); *B01D 2201/302* (2013.01); *B01D 2201/305* (2013.01); *B01D 2201/4084* (2013.01); *C02F 2201/006* (2013.01)

(58) Field of Classification Search
CPC ................ B01D 2201/30; B01D 35/30; B01D 2201/301; B01D 2201/302; B01D 2201/204
USPC ......... 210/234, 232, 235, 236, 237, DIG. 17
See application file for complete search history.

(56) References Cited

U.S. PATENT DOCUMENTS

| | | | |
|---|---|---|---|
| 2,056,635 A | 10/1936 | Wiegand | |
| 2,625,670 A | 1/1953 | Embshoff | |
| 3,319,791 A * | 5/1967 | Horne | 210/234 |
| 4,077,876 A * | 3/1978 | Southall | 210/136 |
| 4,204,965 A | 5/1980 | Vincent | |

(Continued)

FOREIGN PATENT DOCUMENTS

| | | |
|---|---|---|
| CA | 2 051 447 | 10/1990 |
| DE | 38 37 906 A1 | 6/1989 |

(Continued)

*Primary Examiner* — Claire Norris
(74) *Attorney, Agent, or Firm* — Hudak, Shunk & Farine Co, LPA

(57) ABSTRACT

A device for treating water having a cartridge, which includes a container for receiving treatment means and a connecting head. Furthermore, a connecting device is provided, which is equipped with a holder, a valve device, and a locking device. The holder has at least one side wall, on which the inflow and outflow openings are disposed. The valve device has a valve element, which surrounds the connecting head at least partially and is disposed movably in the holder. The associated cartridge provides at least one inlet opening and at least one outlet opening on at least one side surface. The cartridge has at least one recess and/or a lug for the engagement of a locking element of a locking device of the connecting device.

33 Claims, 13 Drawing Sheets

(56) References Cited

U.S. PATENT DOCUMENTS

| | | | |
|---|---|---|---|
| 4,769,131 A | 9/1988 | Noll et al. | |
| 4,931,685 A | 6/1990 | Dobashi et al. | |
| 4,965,484 A | 10/1990 | Fein | |
| 5,059,860 A | 10/1991 | Sato et al. | |
| 5,230,792 A | 7/1993 | Sauska | |
| 5,645,720 A | 7/1997 | Godines | |
| 5,653,871 A * | 8/1997 | Thomsen | 210/232 |
| 5,665,231 A * | 9/1997 | Langsdorf et al. | 210/314 |
| 5,826,854 A | 10/1998 | Janvrin et al. | |
| 5,843,309 A | 12/1998 | Mancil | |
| 5,909,085 A | 6/1999 | Nelson | |
| 6,083,387 A | 7/2000 | LeBlanc et al. | |
| 6,144,175 A | 11/2000 | Parra | |
| 6,265,835 B1 | 7/2001 | Parra | |
| 6,468,419 B1 | 10/2002 | Kunkel | |
| 6,468,420 B1 | 10/2002 | Kunkel | |
| 6,593,704 B2 | 7/2003 | Riepe et al. | |
| 6,924,495 B1 | 8/2005 | Brickley | |
| 7,049,738 B2 | 5/2006 | Fischer et al. | |
| 7,061,173 B2 | 6/2006 | Fischer et al. | |
| 7,122,115 B2 | 10/2006 | Kraft | |
| 7,610,932 B2 * | 11/2009 | Olson et al. | 137/594 |
| 8,097,156 B2 * | 1/2012 | Tubby et al. | 210/234 |
| 2002/0162969 A1 | 11/2002 | Reed | |
| 2003/0230981 A1 | 12/2003 | Hiramoto | |
| 2004/0027075 A1 | 2/2004 | Hataoka et al. | |
| 2004/0061069 A1 | 4/2004 | Schalbe et al. | |
| 2004/0182761 A1 | 9/2004 | Kuennen et al. | |
| 2004/0232846 A1 | 11/2004 | Fischer et al. | |
| 2005/0156119 A1 | 7/2005 | Greene | |
| 2006/0186031 A1 * | 8/2006 | Fick et al. | 210/235 |
| 2007/0114465 A1 | 5/2007 | Sajo et al. | |
| 2007/0209984 A1 | 9/2007 | Lev et al. | |
| 2008/0156738 A1 | 7/2008 | Albrecht et al. | |
| 2008/0190839 A1 * | 8/2008 | Girondi | 210/433.1 |
| 2008/0283464 A1 * | 11/2008 | Hawkins et al. | 210/441 |
| 2008/0314808 A1 | 12/2008 | Vandenbelt et al. | |
| 2009/0145855 A1 | 6/2009 | Day et al. | |
| 2009/0205664 A1 | 8/2009 | Lyon | |
| 2009/0242472 A1 * | 10/2009 | Wallerstorfer | A47J 31/605 210/232 |
| 2011/0139698 A1 | 6/2011 | Freystedt et al. | |

FOREIGN PATENT DOCUMENTS

| | | |
|---|---|---|
| DE | 38 40 276 A1 | 5/1990 |
| DE | 39 24 350 A1 | 1/1991 |
| DE | 42 28 860 A1 | 3/1994 |
| DE | 199 63 649 A1 | 7/2001 |
| DE | 60208437 T2 | 8/2006 |
| DE | 10 2009 000 092 A1 | 1/2010 |
| DE | 10 2008 040 336 A1 | 5/2010 |
| DE | 10 2008 044 294 A1 | 6/2010 |
| EP | 0 064 071 B1 | 5/1985 |
| EP | 0 312 002 A2 | 4/1989 |
| EP | 37 39 966 A1 | 6/1989 |
| EP | 0 611 153 A2 | 8/1994 |
| EP | 0 872 876 A1 | 10/1998 |
| EP | 1 440 941 A1 | 7/2004 |
| GB | 1 451 810 | 10/1976 |
| GB | 2333247 A | 1/1998 |
| GB | 2 384 238 A | 7/2003 |
| JP | 01 260754 | 10/1989 |
| JP | 03 052686 | 3/1991 |
| JP | 07 272686 | 10/1995 |
| JP | 10 174708 | 6/1998 |
| JP | 200279264 | 3/2002 |
| JP | 2003 287356 | 10/2003 |
| WO | 96 09250 A1 | 3/1996 |
| WO | 98 52874 A2 | 11/1998 |
| WO | 00 78678 A2 | 12/2000 |
| WO | 03 045835 A1 | 8/2003 |
| WO | 2004 048276 A1 | 6/2004 |
| WO | 2004 071965 A1 | 8/2004 |
| WO | 2005 100251 A1 | 10/2005 |
| WO | 2005 124236 A2 | 12/2005 |
| WO | 2006 043283 A1 | 4/2006 |
| WO | WO 2007012079 A2 | 1/2007 |
| WO | 2007 025376 A2 | 3/2007 |
| WO | WO2008/017495 A2 * | 2/2008 |
| WO | 2010 004027 A1 | 1/2010 |
| WO | 2010 004028 A1 | 1/2010 |
| WO | 2010 010076 A1 | 1/2010 |
| WO | 2010 063722 A1 | 6/2010 |
| WO | 2010 063723 A1 | 6/2010 |

* cited by examiner

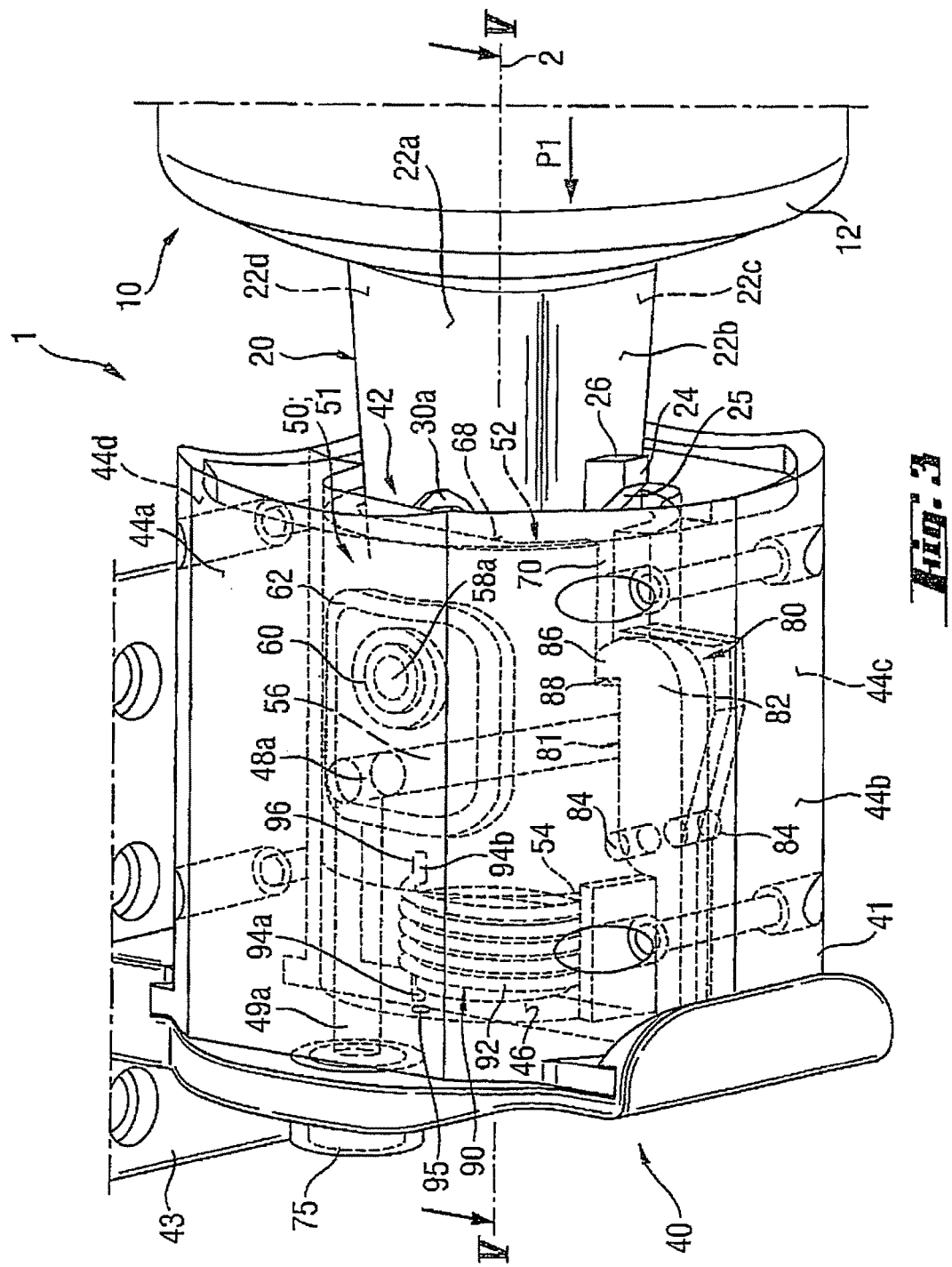

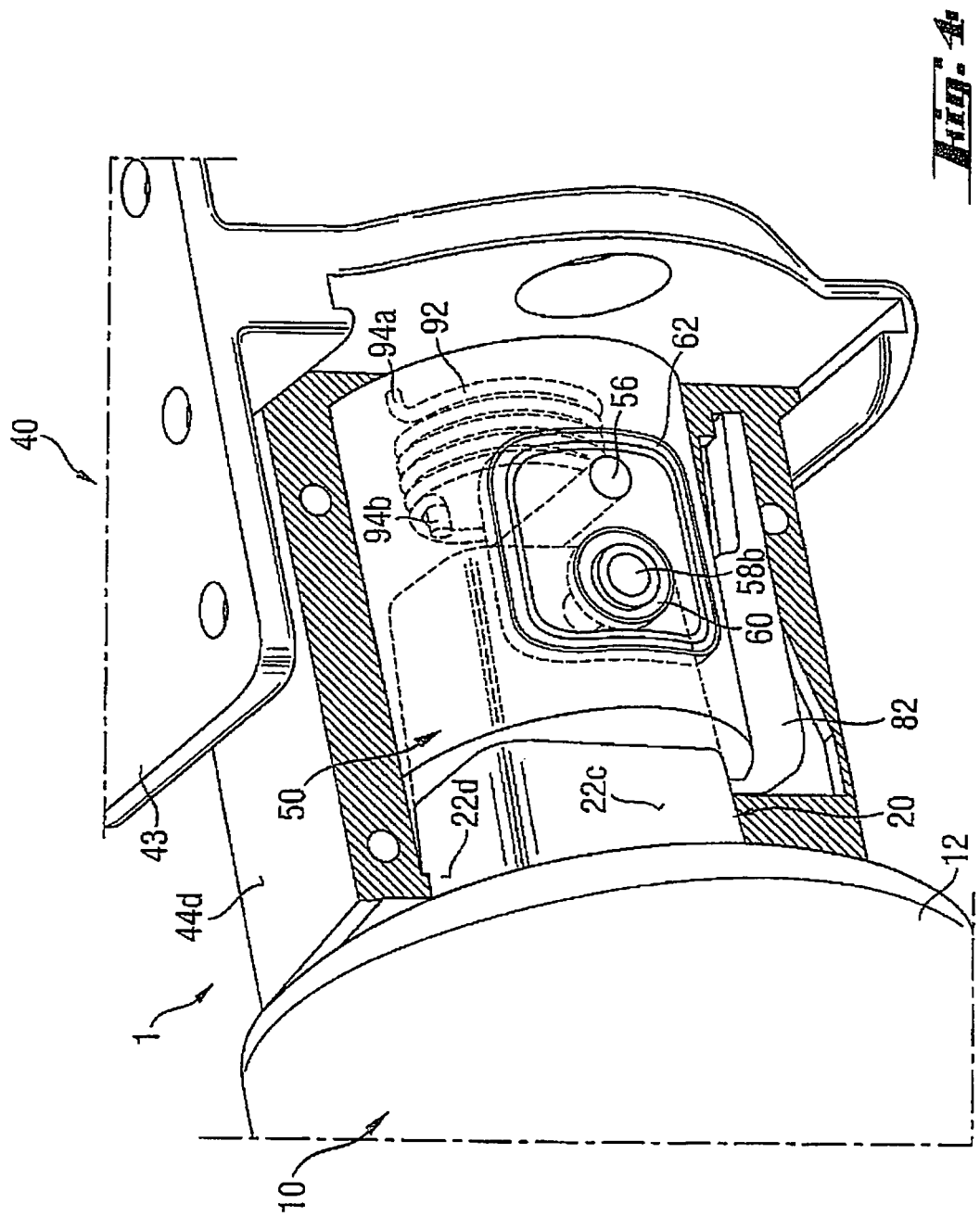

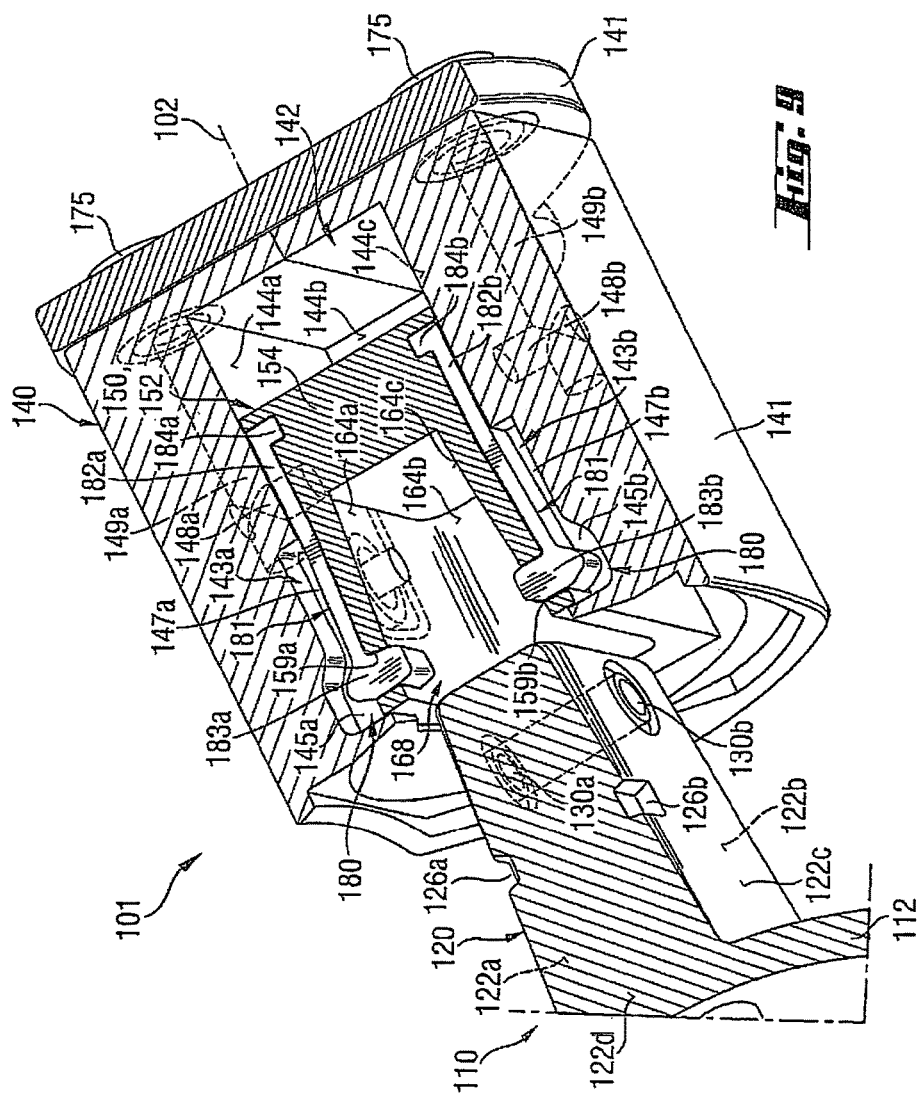

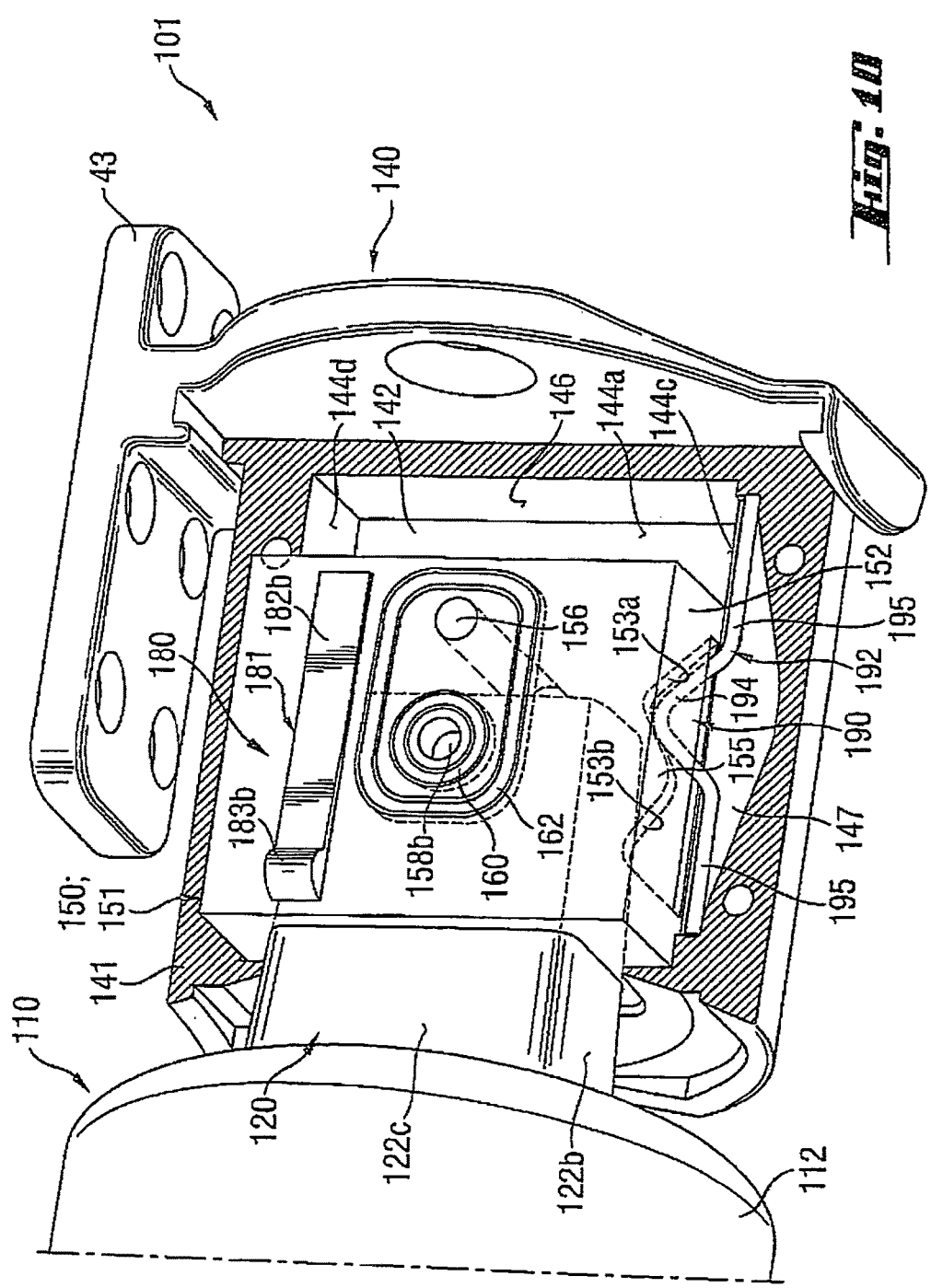

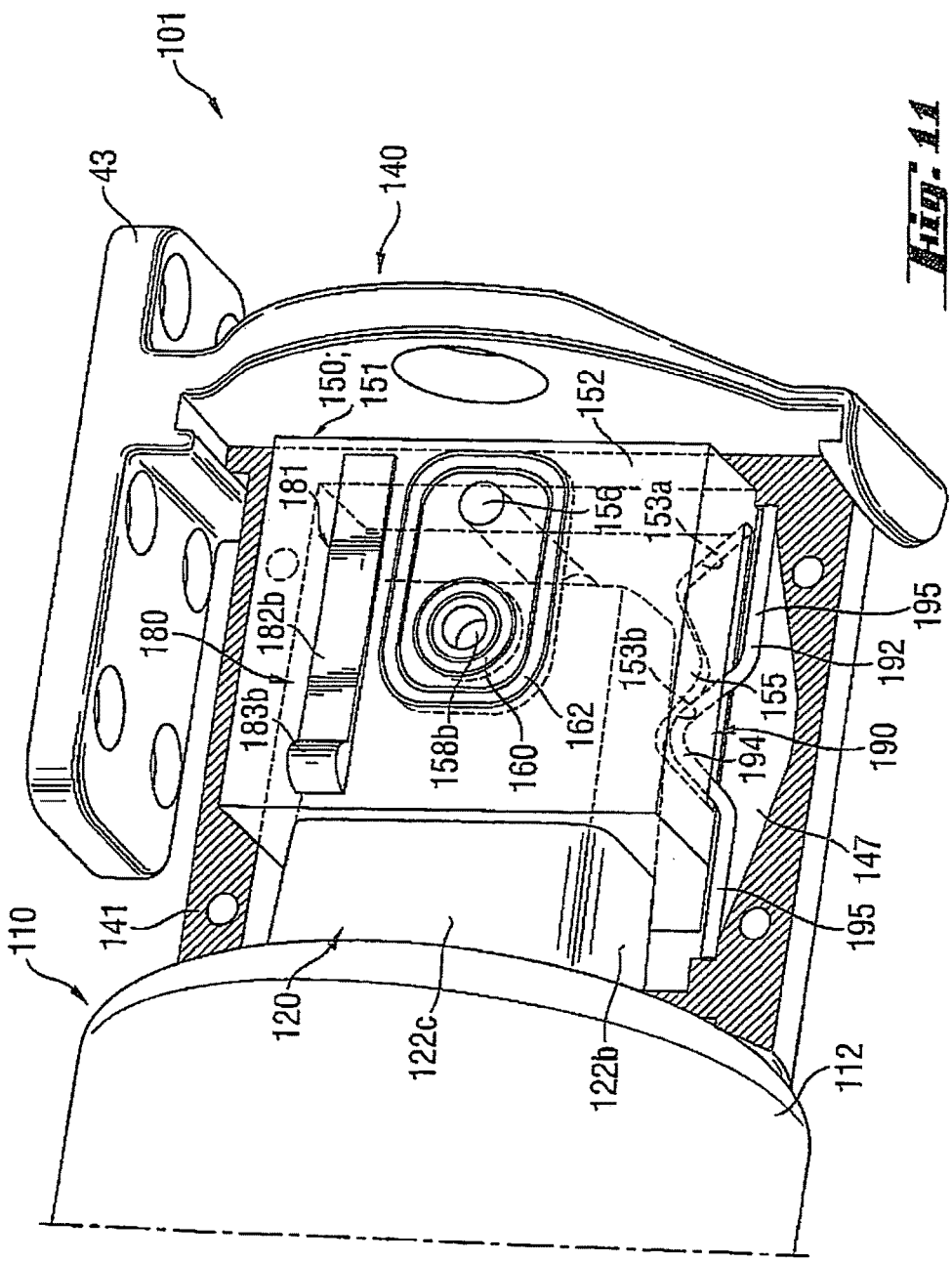

APPARATUS FOR TREATING WATER, PARTICULARLY FILTER APPARATUS, AND CARTRIDGE

FIELD OF THE INVENTION

The invention relates to an apparatus for treating water, particularly a filter apparatus, with a cartridge, which includes a container for receiving treatment means and a connecting head, which has at least one inlet opening and at least one outlet opening, and which is provided with a connecting device, which is provided with a holder for the connecting head, which has at least one inflow opening and at least one outflow opening, a valve device for opening and closing the inflow opening, and a locking device for the releasable fastening of the cartridge to the connecting device. The invention also relates to a cartridge, especially a filter cartridge.

BACKGROUND OF THE INVENTION

By the treatment of water is meant, besides filtration, also the graduated delivery of substances to the water. The delivery of substances can also be combined with a filtration of the water.

By filter cartridges are meant, on the one hand, those which have a sievelike structure for the mechanical filtration. On the other hand, by filter cartridges are meant those which contain, besides a sievelike structure, at least one filter medium, for example one in granulate form, which serves for the chemical and/or mechanical removal and/or reduction of organic and/or inorganic impurities. Thus, filter cartridges of this kind enable a nonmechanical filtration, which can be combined with a mechanical filtration. These filter cartridges are used for optimization of water, meaning by optimization the mechanical and/or nonmechanical filtration. This includes, e.g., the softening and decalcifying of drinking water.

Filtration can be pressure-operated, i.e., it can be carried out with excess pressure, or with partial vacuum, or by gravity forces.

A filter apparatus is known from WO 2007/012079 A2 that has a filter cartridge and a connecting device. The connecting device is generally firmly mounted. The filter cartridge is inserted into this connecting device and after the filter material is used up it is exchanged for a new filter cartridge. The insertion process places a load on the gaskets at the connecting head of the filter cartridge and/or the holder of the connecting device, especially when the inserting process involves a rotational movement of the filter cartridge.

In order to avoid rotational movements, a locking device is proposed that engages with the holder of the cartridge, in which only a translatory movement of the filter cartridge is required both for the installation and the removal of the filter cartridge. This occasions a costly locking device, one working by the principle of a ball point pen, in which the spring device must be configured and arranged so that at least one of the components of the locking device executes a rotational movement.

The water inlet opening of the filter cartridge is disposed at the end face of the connecting head, so that the filter cartridge must be inserted against the direction of flow of the unfiltered water and, thus, against water pressure. In operation of the filter cartridge, the water pressure acts constantly on the filter cartridge and presses it out from the holder. In order to prevent this, yet still fix the filter cartridge securely and immovably in the holder, a stable configuration of the locking device is indispensable. In order to avoid dripping losses when dismounting the filter cartridge, a costly valve construction and a plurality of sealing elements are required.

SUMMARY OF THE INVENTION

The problem of the invention is to provide an apparatus for the treatment of water that makes do with few structural parts, ensures a safe and tight seat for the filter cartridge, and enables an easy replacement of the cartridge.

This problem is solved with an apparatus for treating water comprising a cartridge, which includes a container for receiving treatment means and a connecting head, which has at least one inlet opening and at least one outlet opening, and which is provided with a connecting device, which is provided with a holder for the connecting head, which has at least one inflow opening and at least one outflow opening, a valve device for opening and closing the inflow opening, and a locking device for releasable fastening of the cartridge to the connecting device, wherein the holder has at least one side wall in which the inflow and outflow opening are disposed, and the valve device has a valve element that at least partly surrounds the connecting head and is movably disposed in the holder.

By moving inflow and outflow opening to at least one side wall of the connecting head, the pressure of the untreated water streaming into the cartridge acts perpendicularly to the longitudinal axis of the cartridge and, thus, perpendicularly to the direction of insertion, so that the cartridge cannot be forced out from its position by the water pressure during operation.

The inlet and outlet openings that cooperate with the inflow and outflow openings are likewise disposed in one side surface of the connecting head.

This feature opens the possibility of a simplification of the valve device as compared to the aforementioned prior art. By providing a valve element that at least partly surrounds the connecting head and is movably disposed in the holder, the holder itself is used to guide the valve element. This substantially lowers the costs for the fabrication of the apparatus.

The valve element when inserted into the connecting head is moved by the latter from its position of rest to its working position.

In the position of rest, the valve element closes at least the inflow opening. When the connecting head is installed, not only the valve element but also the connecting head is moved relative to the valve element until both the connecting head and the valve element have reached their end positions.

In this end position, the valve element is in its working position, in which it clears both the inflow opening and the inlet opening opposite the inflow opening, so that the water being treated can flow into the connecting head and thus into the cartridge.

When the connecting head is inserted, the outlet opening and the outflow opening are likewise juxtaposed. This can occur without involvement of the valve element. However, it is preferable that the valve element be configured so that it opens and closes the outlet opening and outflow opening in the same way as for the inflow opening.

The valve element is movably disposed in the holder. Preferably, the valve element is movable at least in the axial direction, i.e., in the direction of the longitudinal axis of the filter cartridge or the connecting device. By this axial mobility is meant a displacement without a rotary component.

Preferably, the valve element is disposed between at least one side wall of the holder and the connecting head. The valve element lies against the side wall of the holder and is preferably movably disposed on the side wall. How the valve element can be movably disposed depends essentially on the movement that occurs during the insertion process.

The valve element is therefore preferably mounted capable of displacement and/or rotation in the direction of the longitudinal axis of the holder. By rotational mounting is meant a rotary movement about the longitudinal axis of the holder. The longitudinal axis of the holder coincides with the direction of insertion of the connecting head.

According to one embodiment it is provided that the connecting head is inserted in the axial direction into the valve element and moved axially in the axial direction with the valve element as far as the end position of the valve element; in the end position, a fixation of the connecting head occurs, especially a locking. For the unlocking, a rotary movement of filter cartridge and valve element is carried out. This design is known as a push-turn design.

According to the second embodiment, the unlocking likewise occurs by an axial movement of the filter cartridge and the valve element in the opposite direction to the insertion, the so-called push-pull design.

The valve element for the opening and closing of the inflow opening can be moved out from the region of the inflow opening or into the region of the inflow opening, respectively. According to one special embodiment, the valve element has at least one recess or at least one opening that is moved in front of the inflow opening to open the inflow opening. Another recess and/or opening can be provided for the outflow opening.

Preferably, the valve element is a platelike element, a shell-like element or a sleeve. The configuration of the valve element depends essentially on the outer contour of the connecting head and the inner contour of the holder. Accordingly, the outer contour in the case of a sleeve can be fashioned round or polygonal, for example.

The holder and/or the connecting head preferably have a rectangular or trapezoidal cross section, which in contrast with round cross sections facilitates the proper positioning of the connecting head in the holder. The rectangular or trapezoidal cross sectional contours are realized in complementary manner to the valve element.

Other cross sections, such as circular arcs with straight segments, are likewise preferred.

Preferably, the valve element has a bottom at the side facing the end face of the holder. The bottom can serve as a surface of engagement for an activating device, especially a spring device, in order to move the valve element into its position of rest. When the valve element is fashioned as a sleeve, the bottom gives the valve element the shape of a cup or pot.

The valve has preferably one through channel in or beneath the bottom, which extends in particular perpendicular to the longitudinal axis. When the connecting device is hooked up to a water pump, for example, that delivers water continuously, it is advantageous if the pump does not need to be switched off during the replacement of the cartridge. The through channel is provided in order to maintain the water flow, connecting the inflow opening to the outflow opening in the position of rest of the valve element. This creates a bypass, through which the water is taken untreated.

The inlet opening and the outlet opening of the connecting head are preferably disposed on opposite sides. The corresponding inflow and outflow openings of the holder are likewise placed oppositely. In this embodiment, the through channel can be configured as a straight through borehole in the bottom of the valve element.

The locking device preferably has a spring device that is disposed between the holder and the valve element. The spring device thus acts on the valve element and can be used to move the valve element, especially in order to move the valve element into its position of rest or to hold the valve element in its position of rest.

The spring device is preferably a compression spring.

Two different configurations of the compression spring are preferred.

According to a first embodiment, the compression spring is disposed between the end face of the holder and the valve element. The compression spring acts in the direction of the longitudinal axis of the holder and displaces the valve element. When the valve element preferably has a bottom, the compression spring can engage with this bottom.

One preferred embodiment of the compression spring is a helical spring. The compression spring can additionally be configured also as a torsion spring. The configuration of the compression spring as a torsion spring is advantageous when the valve element is rotationally mounted in the holder and the unlocking occurs by a rotational movement.

Instead of a combined compression and torsion spring, two springs can also be provided, namely, one compression spring and one torsion spring.

The compression spring, the torsion spring or the combined compression and torsion spring can also be disposed in a middle region of the holder. This spring preferably encloses the valve element, which advantageously shortens the overall length of the connecting device.

According to another embodiment, the compression spring is disposed between a side wall of the holder and the valve element. The compression spring acts on the valve element perpendicularly to the longitudinal axis of the holder and in this way secures the valve element in the desired position.

The compression spring is preferably mounted in a side wall of the holder.

According to one special embodiment, the compression spring is configured as a leaf spring. The leaf spring preferably has a V-shaped segment, and this V-shaped segment can make contact with the valve element.

The valve element has, in its outer surface, at least two neighboring recesses for engaging with the leaf spring. The two recesses create two detent positions, so that the valve element can be secured in its position of rest and in its working position. When the valve element is shifted in the direction of the longitudinal axis of the holder, the leaf spring is forced out from the recess and thereby tensioned. When the neighboring recess of the preferably V-shaped segment is reached, the leaf spring engages with this recess and secures the valve element in the respective position.

The locking device has at least one locking element that engages with the connecting head. By engaging with the connecting head, the locking device has an especially compact form.

So that the locking element can engage with the connecting head, preferably a recess and/or a lug is provided on the connecting head. After the connecting head is inserted, the at least one locking element engages with this recess or with the lug.

According to a first embodiment of the locking mechanism, the locking element is configured so that it locks during a translatory inserting movement of the connecting head and unlocks during a rotary movement of the connecting head.

The locking element according to one special embodiment is a locking pawl. The locking pawl can be disposed in one side wall of the holder. The locking pawl is preferably oriented parallel to the longitudinal axis of the holder.

During the translatory inserting of the connecting head, the locking pawl engages in the recess or with the lug. By a rotary movement, the locking pawl slips out from the recess or moves past the lug, thereby releasing the locking.

According to a second embodiment, the locking element is configured so that it locks during a translatory insertion movement of the connecting head and unlocks during an oppositely directed translatory movement for removal of the connecting head.

The locking element is preferably a flexible rod with a snap-in head.

The flexible rod can be disposed on the outside of the valve element. When the valve element is moved, the locking element is moved along with it. The valve element in this embodiment is part of the locking device.

The snap-in head extends through the valve element preferably inwardly, so as to engage with the lug or recess of the connecting head.

The flexible rod with the snap-in head is preferably guided in a slotted link that is provided in one side wall of the holder. Due to the movement of the valve element, the locking element is moved relative to the holder and thus relative to the side wall of the holder. Thanks to the link, the movement of the snap-in head can be specifically guided perpendicular to the direction of displacement, which occurs in the direction of the longitudinal axis. In this way, it is possible to deliberately control the engaging of the snap-in head, e.g., in the recess, and the releasing of the snap-in head for the unlocking.

The connecting head can furthermore have at least one guiding means, which cooperates with a corresponding guiding means inside the sleeve. Such guiding means can be a web and a groove or the like, by which the positioning of the connecting head relative to the connecting device can be defined in unambiguous manner. Such guiding means can also be configured by the lock and key principle, so that only specially provided cartridges can be connected to the particular connecting device.

The cartridge according to the invention has a container for holding water treatment agents and a connecting head disposed on the container for connection to a connecting device, wherein the connecting head has on at least one side surface at least one inlet opening and at least one outlet opening and at least one recess and/or lug for engaging a locking element of a locking device of the connecting device.

Preferably the connecting head has at least one additional guiding means.

Such apparatus find preferred application in refrigerators. Large-volume refrigerators can be provided with a tap, so that water cooled inside the refrigerator and filtered, for example, can be tapped. The connecting device is thus installed permanently in the interior of the refrigerator and connected to the household water line, for example.

BRIEF DESCRIPTION OF THE DRAWINGS

Two sample embodiments of the invention shall now be further explained by means of the drawings.

These show:

FIG. 1 shows a perspective view of an apparatus 1, 101 for treatment of water, having a connecting device 40, 140 and a cartridge 10, 110 connected to the connecting device 40, 140.

DETAILED DESCRIPTION OF THE INVENTION

Figure 1:
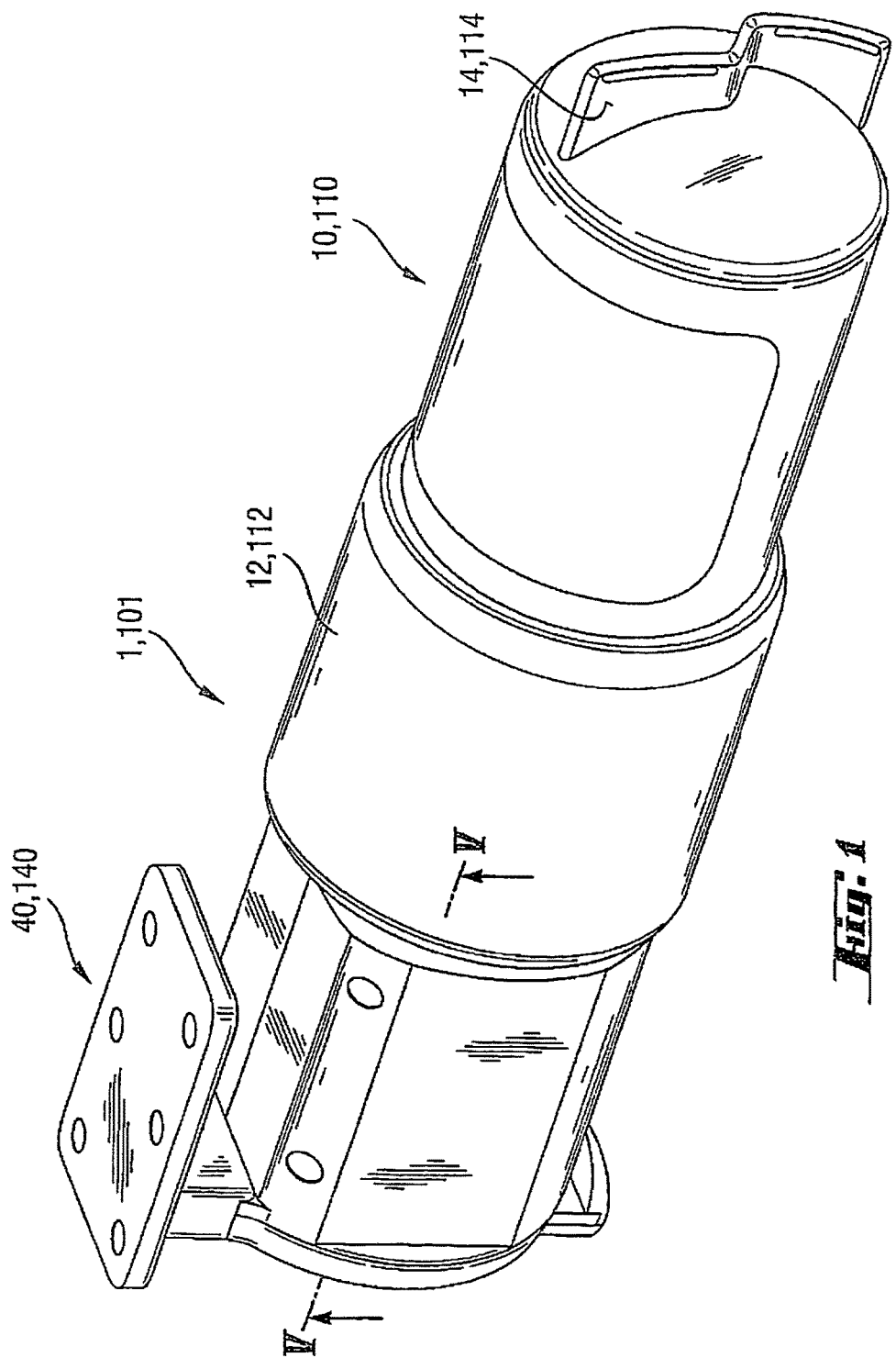
FIG. 1 a perspective representation of an apparatus for treatment of water with a cartridge and a connecting device, seen from the cartridge side, FIG. 2 a perspective representation according to FIG. 1, seen from the connection side, FIG. 3 an enlarged partial view of the left end of the apparatus shown in FIG. 1 according to a first embodiment at the start of the inserting of the connecting head in the connecting device, FIG. 4 a view looking at the right end of the apparatus per FIG. 2, the connecting head being fully inserted into the connecting device, FIG. 5*a* a longitudinal section in the plane V-V of FIGS. 1 and 3 through the connecting head with valve device during nonfunctional operation for replacement of the cartridge, FIG. 5*b* a longitudinal section per FIG. 5*a* according to another embodiment, FIG. 5*c* a longitudinal section per FIG. 5*a* according to another embodiment, FIG. 6 a longitudinal section through the connecting head with valve device per FIG. 5 during filter operation, FIG. 7 in perspective the locking device for the connecting head with the valve device in the locked state, FIG. 8 a view as in FIG. 7, but in the nonlocked state, FIG. 9 an enlarged partial view of the apparatus shown in FIG. 1 according to a second embodiment at the start of the inserting of the connecting head into the connecting device, FIG. 10 a partial view of the apparatus per FIG. 9, where the connecting head has been further inserted, but not yet reached its end position, FIG. 11 a view of the apparatus per FIGS. 9 and 10, where the connecting head is fully inserted.

We denote with 1 the apparatus according to the first embodiment in accordance with FIGS. 3 to 8 and with 101 the apparatus according to the embodiment of FIGS. 9 to 11. The same holds for the other 1 and 2 or 3-place reference numbers.

The cartridge 10, 110 has a container 12, 112 to hold a treatment agent for water, which is supplied via the connecting device 40, 140 of the cartridge 10, 110. The treated water is likewise taken away via the connecting device 40, 140. The cartridge 10, 110 can be, for example, a filter cartridge.

The connecting device 40, 140 is mounted stationary by a mounting plate 43, for example, in a refrigerator.

The cartridge 10, 110 has to be replaced after using up the treatment agent located in it. In order to facilitate this process, the container 12, 112 has at its rear end a handle 14, 114, by which the cartridge 10, 110 can be grasped and twisted, depending on the configuration of the connecting device 40, 140.

Figure 2:
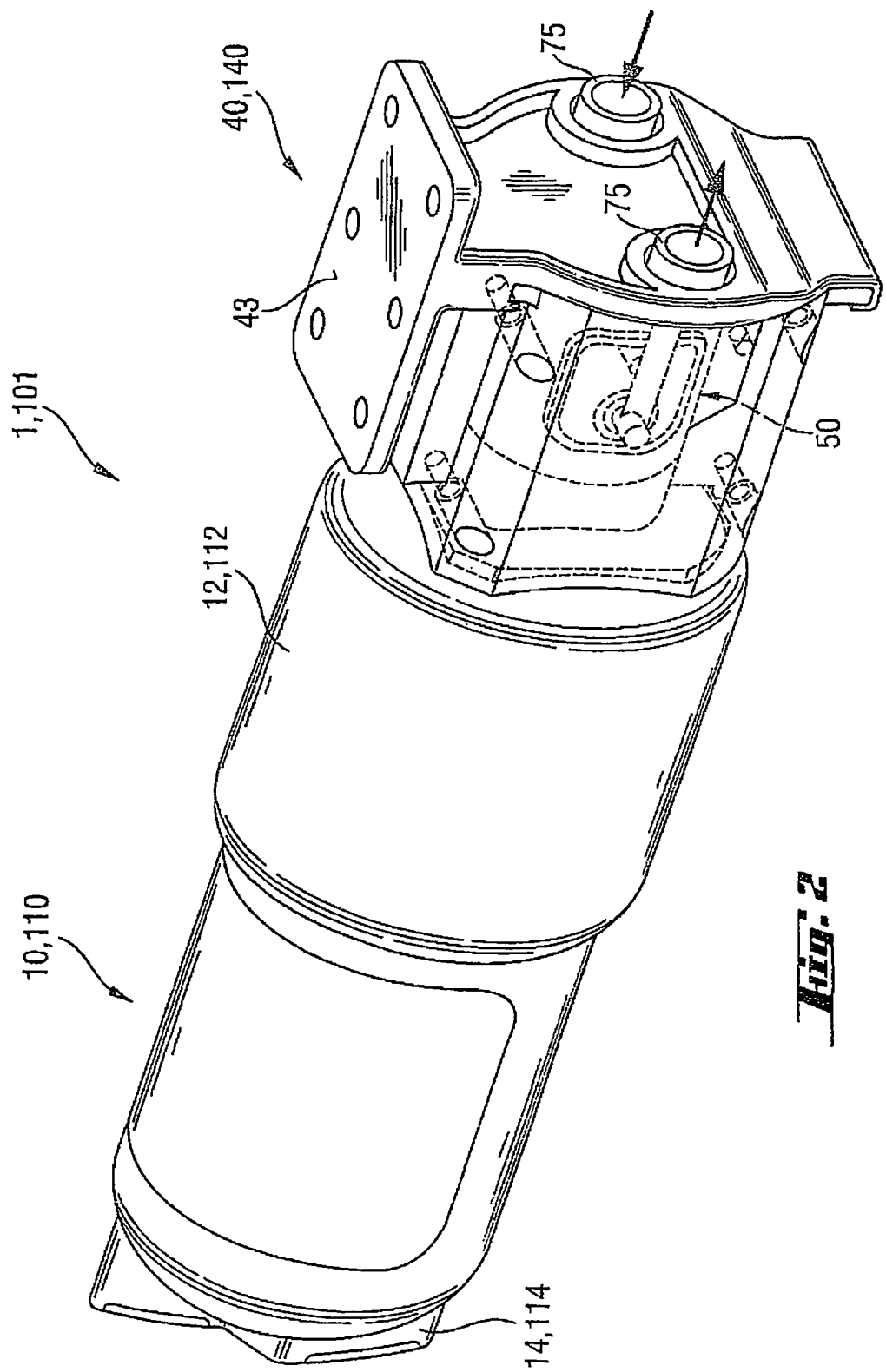

FIG. 2 is a perspective view of the apparatus 1, 101 per FIG. 1 at the connecting end, so that the two connection fittings 75 for the supply of water being treated and the removal of the treated water, as well as part of the inside of the connecting device 40, 140 can be seen. The connection fittings 75, 175 are disposed in the rear wall of the connecting device 40, 140.

In FIGS. 3 to 8, a first embodiment of the apparatus (apparatus 1) is shown, being termed the push-turn variant. The cartridge 10 is situated at the beginning of the insertion process per FIGS. 3 to 5.

The cartridge 10, 110 has a connecting head 20 on the container 12, which in the embodiment shown here has a rectangular cross section. Accordingly, the connecting head 20 has four side surfaces 22a to 22d, only the two surfaces 22a and 22b being visible. The side surfaces not visible are indicated by broken-line references 22c and 22d.

In the surface 22a there is shown an inlet opening 30a. In the opposite side surface 22c is located the outlet opening 30b (see also FIGS. 5a, b, c and 6). On the surface 22b, moreover, there is provided a lug 24 as an outwardly pointing projection (see also FIGS. 7 and 8). This lug 24 has a bevel 25 on the side facing the connecting device 40 and an abutment surface 26 disposed essentially perpendicular to the surface 22b on the side away from the connecting device 40. This lug 24 cooperates with a locking element 81, as shall be further described below.

The connecting device 40 has a housing 41, which is fastened to the mounting plate 43. Inside the housing 41 there is a holder 42 in the shape of a chamber open at one end with side walls 44a-d and end face 46. Moreover, channels 49a, b are disposed in the housing 41, extending in the axial direction and connecting the connection fittings 75 to the inflow and outflow openings 48a and 48b which emerge into the holder 42.

In the holder 42 is disposed a valve device 50 with a valve element 51 in the form of a sleeve 52, able to move in the direction of the longitudinal axis 2 of the holder 20. The sleeve 52 has an inner space 68 whose cross section is adapted to the rectangular cross section of the connecting head 20.

The sleeve 52 has, at the side away from the connecting head 20, a potlike depression with a bottom 54. Between the end face 46 of the holder 42 and the bottom 54 of the sleeve 52 is provided a spring device 90, consisting of a helical spring 92. The helical spring 92 engages by its two ends with annular shoulders on the bottom 54 and at the end face 46. The helical spring has a fixation pin 94a at one end, which engages in a corresponding recess 95 in the end face 46 of the holder 42. At the other end of the helical spring 92 is disposed another fixation pin 94b, which engages in a corresponding recess 96 in the bottom 54 of the sleeve 52. This helical spring 92 is a compression spring and also serves as a torsion spring at the same time.

Figure 5A:
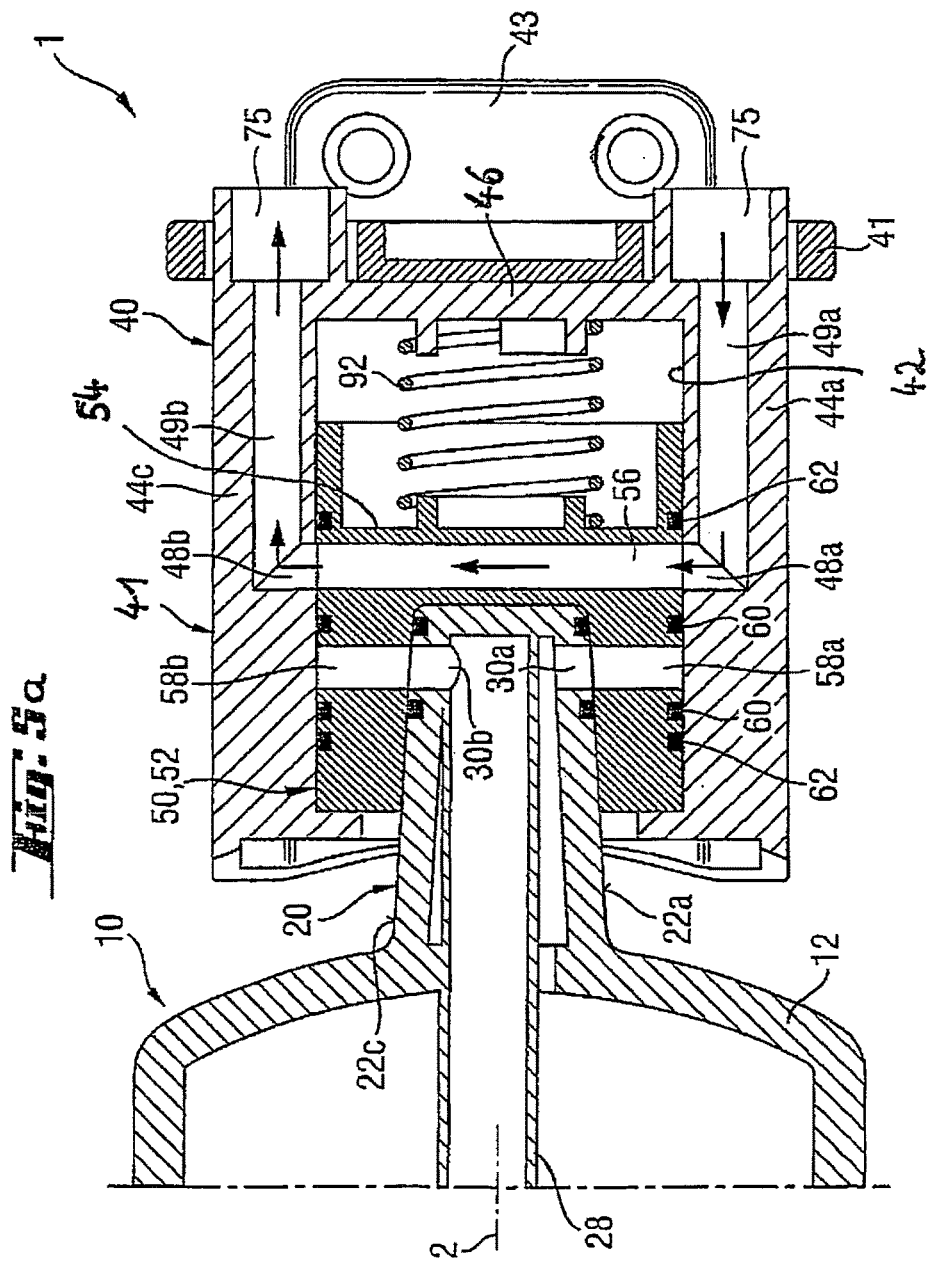
Figure 6:
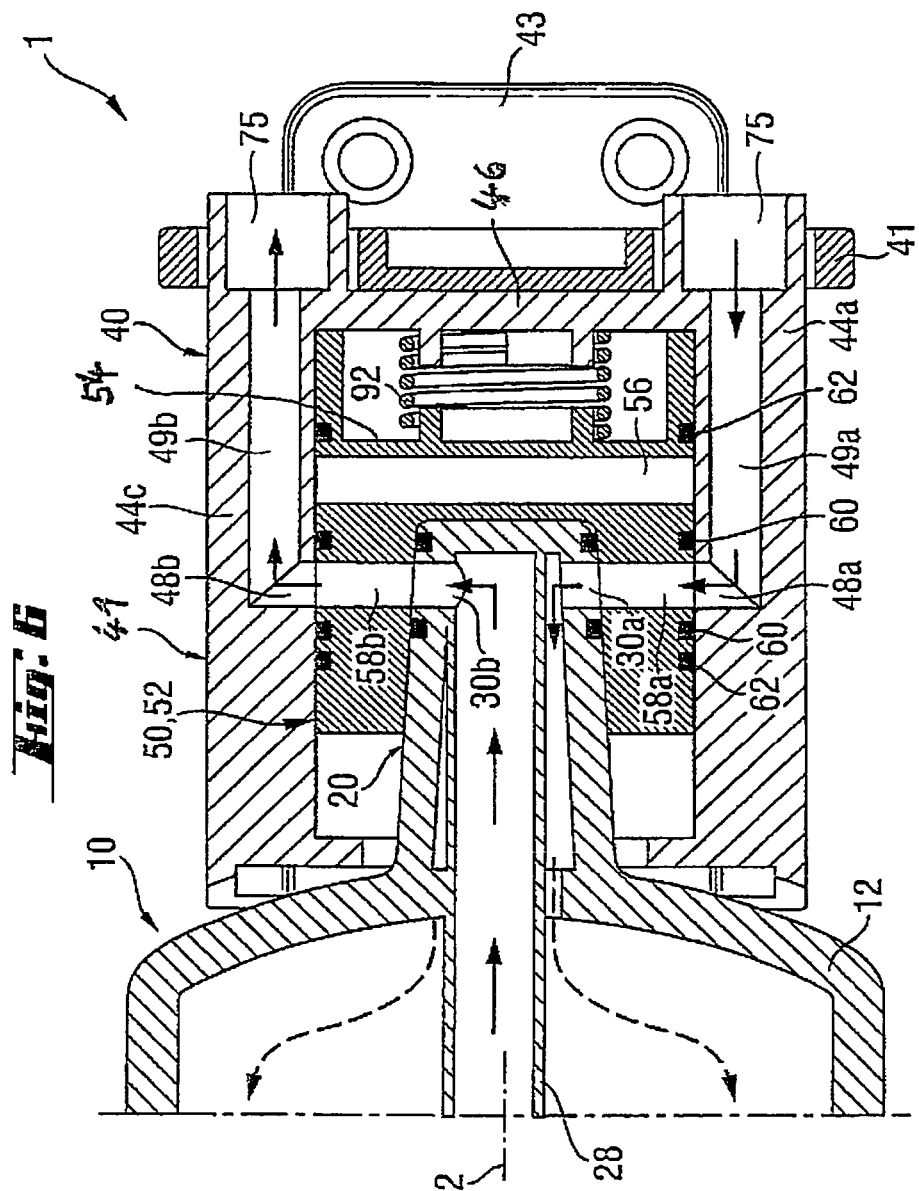

As can be seen in FIG. 3 in conjunction with FIGS. 5a and 6, the sleeve 52 has two oppositely disposed boreholes, which extend perpendicular to the axis 2 and form the openings 58a, b, by which the inflow opening 48a is connected to the inlet opening 30a and the outflow opening 48b to the outlet opening 30b when the connecting head 20 is fully introduced into the connecting device 40.

The sleeve 52 has a through borehole 56 under the bottom 54, extending perpendicular to the longitudinal axis 2, which connects the inflow opening 48a to the outflow opening 48b. Water that is supplied from the lower connection fitting 75 via the channel 49 will be taken (see also FIG. 5a, b, c) via the through borehole 56 to the opening 48b and drained away via the channel 49b in the housing 41 and via the connection fitting 75. This bypass channel ensures that no water losses occur in the position of rest of the sleeve 52 (FIG. 5), in particular, that no water can emerge uncontrolled, and that the water supply to a connected machine remains intact.

On the outside of the sleeve 52, around the opening 58a, there is a sealing ring 60. Another sealing ring 62 is placed around the sealing ring 60 and the opening of the through bore 56 (see also FIG. 6). The two sealing rings 60, 62 can form a single part, e.g., in the form of a plate or sealing pad with molded-on sealing rings 60, 62. The part can consist of polypropylene, coated with polytetrafluorethylene in the region of the sealing rings.

Figure 5B:
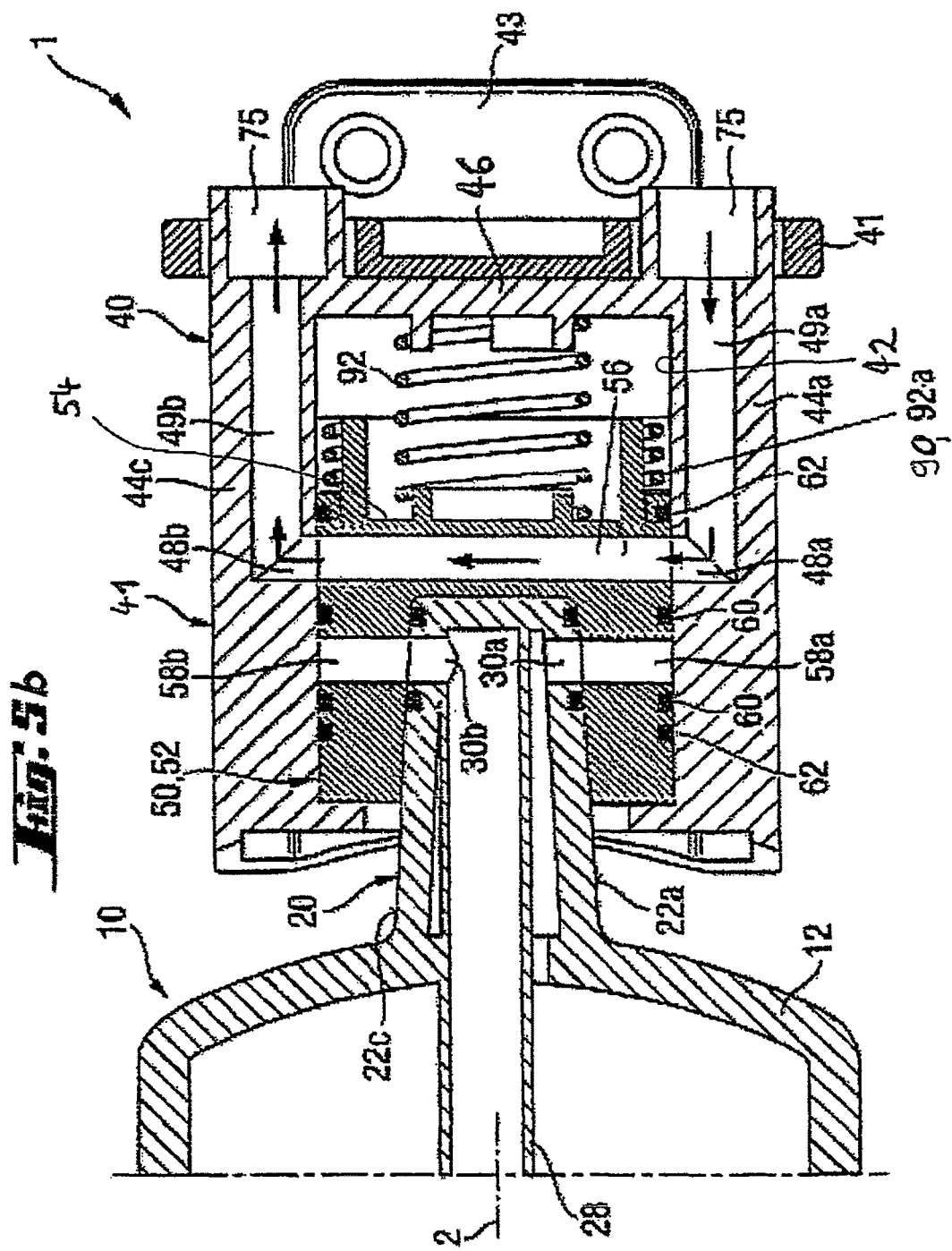

In FIG. 5b is shown a longitudinal section through an apparatus 1 according to another embodiment. In contrast with the embodiment of FIG. 5a, where the spring 90 is configured both as a compression and a torsion spring, the two functions are divided between two helical springs 92, 92a. Here, the spring 92 is configured as a compression spring and the spring 92a as a torsion spring. The sleeve 52 has a reduced outer diameter in the region of the potlike depression, so that the torsion spring 92a can be disposed in the annular intermediate space between sleeve 52 and holder 42. One end of the torsion spring 92a is fixed on the sleeve 52, while the other end is fixed in the rotary direction in a groove extending in the axial direction in the wall of the holder 42 (not shown). In this way, the fixation in the rotary direction remains preserved when the sleeve 52 is shoved in the axial direction.

Figure 5C:
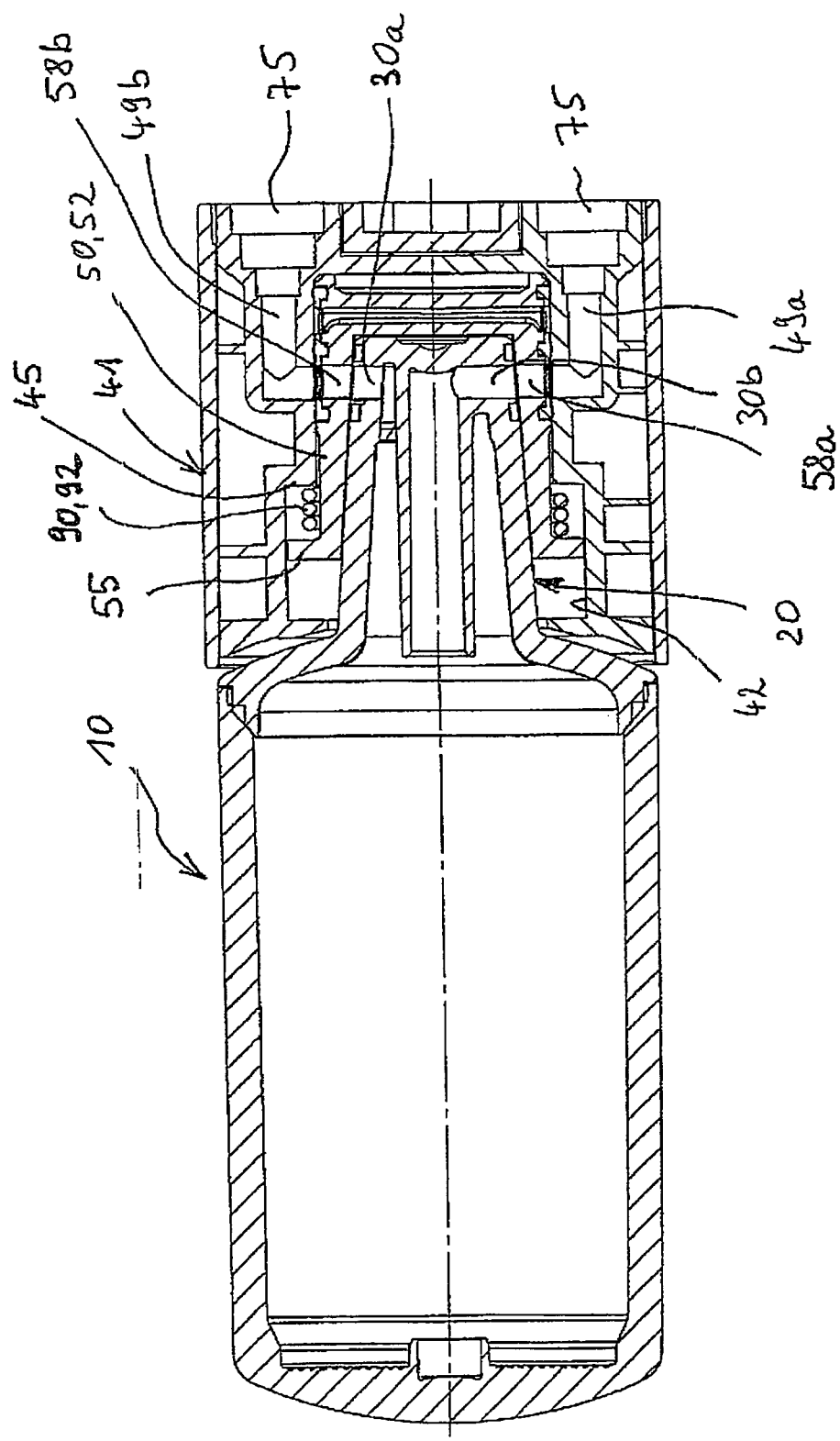

In FIG. 5c, a longitudinal section is shown through an apparatus 1 according to another embodiment, in which the spring device 90 is disposed in a middle region of the connecting device 40. In contrast with the two previously described embodiments, no space is needed for the spring device between the bottom 54 of the sleeve 50 and the end face 46, so that the structural length of the connecting device 40 could be shortened.

The sleeve 50 has at its end facing the cartridge 10 a radially outwardly projecting annular flange 55. The housing 41 has an annular shoulder 45 in a middle region of the holder 42, so that the holder 42 has a diameter-sized segment with which the annular flange 55 engages and is bounded in its movement in the axial direction. Between annular flange 55 and the annular shoulder 45 the spring device 90 in the form of a helical screw is disposed, which likewise combines the two functions (compression spring and torsion spring). The two ends of the helical spring 92 are fixed on the annular shoulder 45 and the annular flange 55.

Figure 7:
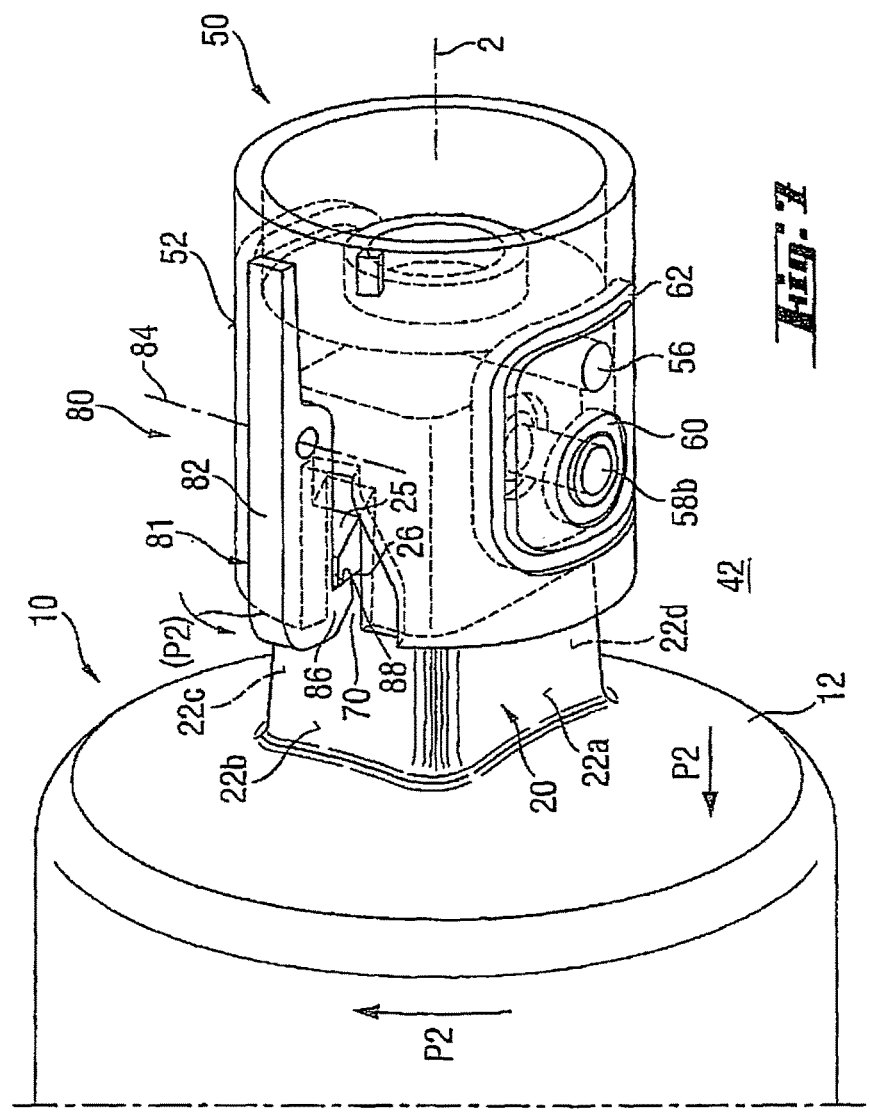
Figure 8:
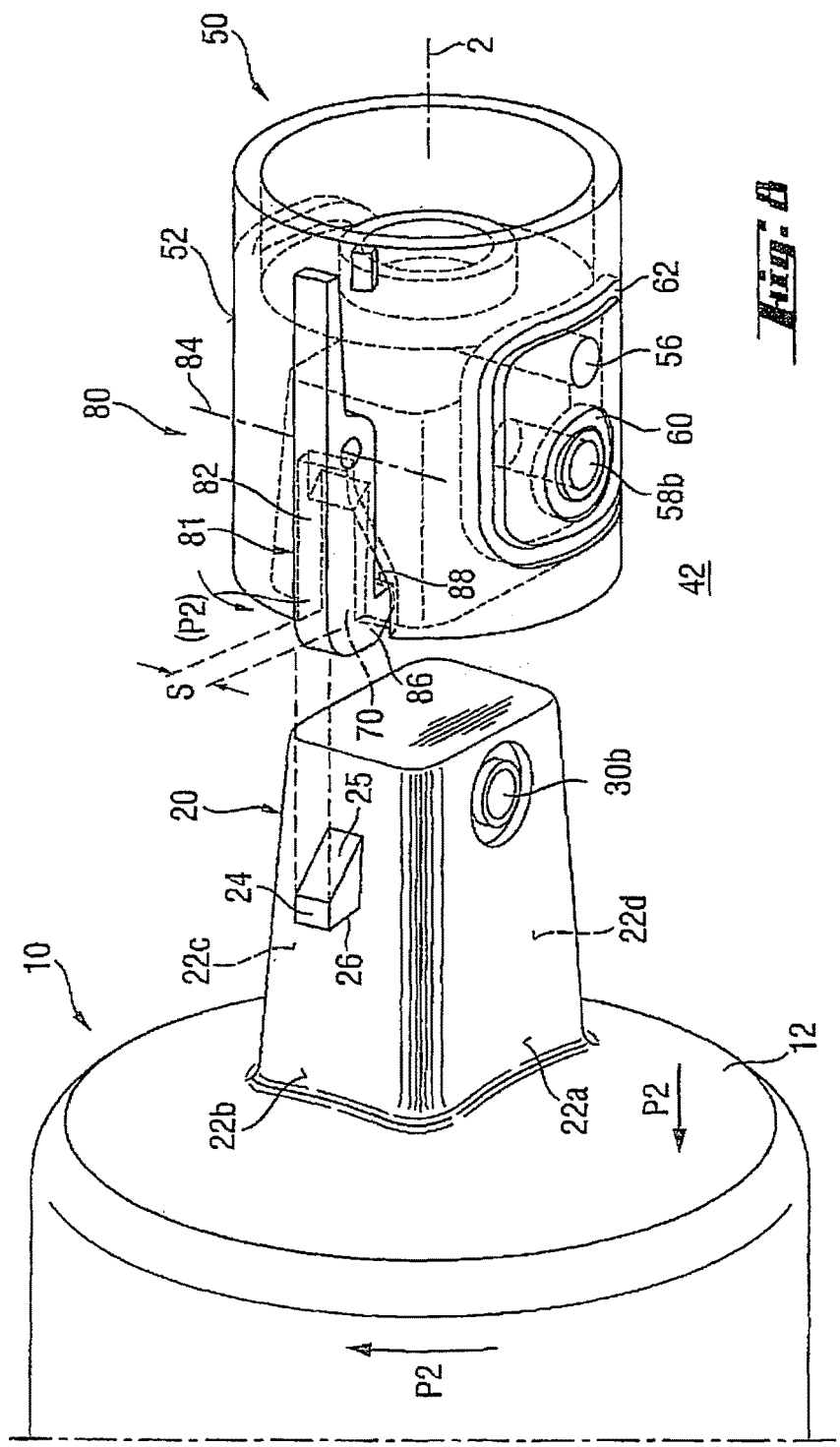

As shown especially by FIGS. 7 and 8, a locking device 80 is provided, having a locking element 81 in the form of a locking pawl 82. This locking pawl 82 extends parallel to the axis 2 and is mounted in the side wall 44b of the holder 42 by means of pivots about an axis 84 extending perpendicular to the axis 2 and able to swivel. The locking pawl 82 is fashioned as a two-arm lever and has a pawl head 86 at the end facing the cartridge 10, projecting into the inner space of the holder 42. The pawl head 86 has an abutment surface 88.

When the connecting head of the cartridge 10 is introduced into the inner space 68 of the sleeve 52 (the direction of movement is indicated by the arrow P1), the locking lug 24 engages in a slot 70 of the sleeve 52 (see FIG. 3 and FIG. 8 with S the width of the slot), whereupon the bevel 25 radially deflects the locking pawl 82 until the connecting head 20 is fully introduced. The locking pawl 82 springs back to its starting position and presses the lug 24 against the abutment surface 26. The connecting head 20 is then locked (also see FIG. 7 for this).

In the insertion process, not only is the connecting head 20 introduced into the sleeve 52, but also the sleeve 52 is pushed against the action of the helical spring 92 into the holder 42. In this way, all openings 30a, 48a, 58a and 30b, 48b, 58b are brought into line (FIGS. 6 and 7).

In this end position, the water brought in through the channel 49a is supplied through the opening 58a to the inlet opening 30a, so that the water is introduced into the cartridge 10. The treated water is taken away in identical fashion through an inner pipe 28 (FIGS. 5 and 6) on the opposite side. This end position, in which the sleeve 52 is in its working position, is shown in FIG. 6. The through borehole 56 is without function in this case.

To replace the cartridge 10 and remove the sleeve 52 from the holder 42 and the inner space 68, the cartridge 10 is turned in the direction of arrow P2 (see FIG. 7). In this way, the sleeve 52 is turned at the same time against the force of the helical spring 92, likewise acting as a torsion spring (FIG. 7), so that the locking pawl 82 is disengaged from the lug 24 (FIG. 8). Thanks to the restoring force of the pretensioned helical spring 92, the sleeve 52 is forced outward at the same time and the released cartridge 10 can be pulled out in the axial direction 2 (FIG. 8).

In FIGS. 9 to 11, the second embodiment of the apparatus (apparatus 101) is shown—the so-called push-pull variant, partly in sectional view, whose internal construction differs from the apparatus 1 essentially in a modified valve device 150 and a modified locking device 180. The cartridge 110 has a container 112 and a connecting head 120 with four side surfaces 122a to d, while one inlet opening 130a and one outlet opening 130b are disposed in two opposite side surfaces 122a, c.

Instead of a lug 24, two recesses 126a, b are provided in the edge region of the side surfaces 122a, b and 122b, c.

The connecting device 140 with housing 141, connection fittings 175, channels 149a, b, inflow opening 148a and outflow opening 148b as well as holder 142 of the second embodiment corresponds to the first embodiment. The same holds for the through borehole 156 in the bottom 154 of the sleeve 152 and the sealing rings 160, 162.

The essential difference from the first embodiment consists in that two locking elements 181 are provided, which are disposed not in one side wall 144a to d of the holder 142, but instead on the outside of the sleeve 152. The locking elements 181 are flexible rods 182a, b, which at their end away from the cartridge 110 are fixed in the axial direction in the sleeve 152 by lugs 184a, b in the bottom 154.

At the opposite end, these flexible rods 182a, b each have a snap-in head 183a, b, the snap-in heads 183a, b extending through openings 159a, b into the inner space 168 of the sleeve 152 and projecting inwardly relative to the side walls 164a, c of the inner space 168.

The side walls 144a and 144b of the holder 142 each have a slotted link 143a, b, which basically consists of a bypass space 145a, b and a guide path 147a, b.

In the position shown in FIG. 9, the sleeve 152 is in its position of rest and ready to receive the connecting head 120. When the connecting head 120 is inserted in the direction of the longitudinal axis 102 into the inner space 168, the snap-in heads 183a, b slide along the respective side walls 122a, b of the connecting head 120 until they reach the recesses 126a, b provided there. During this movement process, the snap-in heads 183a, b are moved back into the bypass space 145a, b. At the same time, when the connecting head 120 is inserted the sleeve 152 is also shoved into the holder 142. Now each snap-in head 183a, b reaches its guide path 147a, b, so that the snap-in heads 183a, b are forced inward and engage with the recesses 126a, b. In the end position, when the snap-in heads 183a, b have reached the end region of the respective guide path 147a, b, the connecting head 120 of the cartridge 110 is fixed in place.

The inserting movement of the sleeve 152—as shown in FIG. 10—is against the action of a spring device 190, which has a leaf spring 192 that has a V-shaped segment 194 in the middle. The leaf spring 192 is disposed in the wall 144c of the holder 142 and can be diverted into a free space 147 located in the wall 144c.

The V-shaped segment 194 engages with a recess 153a of the sleeve 152. In this position, the sleeve 152 is fixed in its position of rest. When the connecting head 120 is introduced into the sleeve 152, at the same time the sleeve 152 is also shoved further into the holder 142, so that the leaf spring 192 dips into the free space 147 by its segment 194 and the adjoining legs 195. After overcoming the obstacle 155, the V-shaped segment 194 of the leaf spring 192 engages with the neighboring recess 153b, as is shown in FIG. 11. In FIG. 11 one sees the end position and, thus, the locked state.

To remove the cartridge 110, this is pulled back with a translatory movement, whereupon at first the connecting head 120 and the sleeve 152 remain joined together by the flexible rods 182a, b and their snap-in heads 183a, b, so that the valve element 151 is pulled by the cartridge 110 into its position of rest.

The V-shaped segment 194 of the leaf spring 192 leaves the recess 153b in the sleeve 152 and after overcoming the obstacle 155 arrives at the neighboring recess 153a.

During this movement of the sleeve 152, the snap-in heads 183a, b are moved forward in the slotted links 143a, b until they reach the bypass spaces 145a, b and spring back into the respective bypass space 145a, b thanks to the spring action of the flexible rods 182a, b. The snap-in heads 183a, b leave the recesses 126a, b and release the connecting head 120. The cartridge 110 can now be removed.

LIST OF REFERENCE NUMBERS

1 Apparatus for treatment of water
2 Longitudinal axis
10 Cartridge
12 Container
14 Handle
20 Connecting head
22a-d Side surface
24 Lug
25 Bevel
26 Abutment surface
28 Inner pipe
30a Inlet opening of the connecting head
30b Outlet opening of the connecting head
40 Connecting device
41 Housing
42 Holder
43 Mounting plate
44a-d Side wall
45 Ring step
46 End face
48a Inflow opening
48b Outflow opening
49a, b Channel
50 Valve device
51 Valve element
52 Sleeve
54 Bottom of sleeve
55 Ring flange 56 Through borehole
58a, b Opening
60 Sealing ring
62 Sealing ring
68 Inner space of sleeve
70 Slot
75 Connection fitting
80 Locking device
81 Locking element
82 Locking pawl
84 Axis
86 Pawl head
88 Abutment surface
90 Spring device
92, 92a Helical spring
94a, b Fixing pin
95 Recess for fixing pin 94a
96 Recess for fixing pin 94b
101 Filter apparatus
102 Longitudinal axis
110 Cartridge
112 Container
114 Handle
120 Connecting head
122a-d Side surface
126a, b Recess
130a Inlet opening of the connecting head
130b Outlet opening of the connecting head
140 Connecting device
141 Housing
142 Holder
143a, b Slotted link
144a-d Side wall
145a, b By-pass space
147 Free space
147a, b Guide path
148a Inflow opening
148b Outflow opening
149a, b Channel
150 Valve device
151 Valve element
152 Sleeve
153a, b Recess
154 Bottom of sleeve
155 Obstacle
156 Through borehole
158a, b Opening
159a, b Opening
160 Sealing ring
162 Sealing ring
164a-d Side wall
168 Inner space of sleeve
175 Connection fitting
180 Locking device
181 Locking element
182a, b Flexible rod
183a, b Snap-in head
184a, b Lug
190 Spring device
192 Leaf spring
194 V-shaped segment
195 Leg of leaf spring 192
P1 Insert arrow for cartridge
P2 Turn arrow for cartridge
S Slot width

What is claimed is:

1. An apparatus for treating water, comprising:
    a) a cartridge, which includes a container for receiving treatment means and a connecting head connected to the container, wherein the connecting head has at least one side surface, disposed parallel to a direction of insertion of the connecting head into a connecting device, the at least one side surface having at least one inlet opening and at least one outlet opening, and
    b) a connecting device into which the connecting head of the cartridge is releasably insertable, wherein the connecting device is provided with
    a single holder for the connecting head, which has at least one inflow opening and at least one outflow opening,
    a valve device for opening and closing the inflow opening, and
    a locking device for releasable fastening of the cartridge to the connecting device,
    wherein the holder has at least one side wall, disposed parallel to a direction of insertion of the connecting head into the connecting device, in which the inflow and outflow opening are disposed, and
    the valve device has a valve element that at least partly surrounds the connecting head and the valve element is movably disposed in the holder.

2. The apparatus according to claim 1, wherein the valve element is disposed between at least one side wall of the holder and the connecting head.

3. The apparatus according to claim 1, wherein the valve element is mounted capable of displacement and/or rotation in the direction of the longitudinal axis of the holder.

4. The apparatus according to claim 1, wherein the valve element has at least one recess or one opening.

5. The apparatus according to claim 1, wherein the valve element is a sleeve.

6. The apparatus according to claim 1, wherein the holder and/or the connecting head have a rectangular cross section.

7. The apparatus according to claim 1, wherein the valve element has a bottom at the side facing an end face of the holder.

8. The apparatus according to claim 7, wherein the bottom has a through channel.

9. The apparatus according to claim 1, wherein the inlet opening and the outlet opening of the connecting head are disposed on opposite sides of the connecting head.

10. The apparatus according to claim 1, wherein the locking device has a spring device that is disposed between the holder and the valve element.

11. The apparatus according to claim 10, wherein the spring device comprises a compression spring.

12. The apparatus according to claim 11, wherein the compression spring is disposed between an end face of the holder and the valve element.

13. The apparatus according to claim 11, wherein the compression spring is a helical spring.

14. The apparatus according to claim 13, wherein the helical spring is a torsion spring.

15. The apparatus according to claim 11, wherein the compression spring is disposed between a side wall of the holder and the valve element.

16. The apparatus according to claim 15, wherein the compression spring is mounted in a side wall of the holder.

17. The apparatus according to claim 11, wherein the compression spring is a leaf spring.

18. The apparatus according to claim 17, wherein the leaf spring has at least one V-shaped segment.

19. The apparatus according to claim 17, wherein the valve element has, in its outer surface, at least two neighboring recesses for engaging with the leaf spring in two detent positions.

20. The apparatus according to claim 1, wherein the locking device has at least one locking element that engages with the connecting head.

21. The apparatus according to claim 1, wherein the connecting head has a recess and/or a lug.

22. The apparatus according to claim 20, wherein the locking element is configured so that it locks during a translatory inserting movement of the connecting head and unlocks during a rotary movement of the connecting head.

23. The apparatus according to claim 20 wherein the locking element is a locking pawl.

24. The apparatus according to claim 23, wherein the locking pawl is disposed in one side wall of the holder.

25. The apparatus according to claim 24, wherein the locking pawl extends parallel to a longitudinal axis of the holder.

26. The apparatus according to claim 20, wherein the locking element is configured so that it locks during a translatory inserting movement of the connecting head and unlocks during an opposite translatory movement to remove the connecting head.

27. The apparatus according to claim 26, wherein the locking element is a flexible rod with a snap-in head.

28. The apparatus according to claim 27, wherein the flexible rod is disposed on the outside of the valve element.

29. The apparatus according to claim 28, wherein the snap-in head extends through a side wall of the valve element, that is in a form of a sleeve, into an inner space of the sleeve.

30. The apparatus according to claim 27, wherein the flexible rod with the snap-in head is guided in a slotted link that is disposed in the side wall of the holder.

31. The apparatus according to claim 1, wherein the connecting head has at least one guiding means, which cooperates with a corresponding guiding means inside the valve element in the form of a sleeve.

32. A cartridge comprising: a container for holding water treatment agents and with a single connecting head disposed on and connected to the container, wherein the connecting head has an end face, wherein the connecting head has side surfaces, disposed parallel to a direction of insertion of the connecting head into the connecting device, a first side surface of the side surfaces having at least one inlet opening within the first side surface and a second side surface of the side surfaces having at least one outlet opening within the second side surface; and the side surfaces having at least one recess and/or a lug, wherein the inlet opening and the outlet opening of the connecting head are disposed on opposite side surfaces of the single connecting head.

33. The cartridge according to claim 32, wherein the connecting head has at least one guiding means.

\* \* \* \* \*